July 21, 1925.

E. J. SOKOL

AUTOMOBILE TRANSMISSION LOCK

Filed March 15, 1924

INVENTOR.
Edward J. Sokol
BY
ATTORNEY.

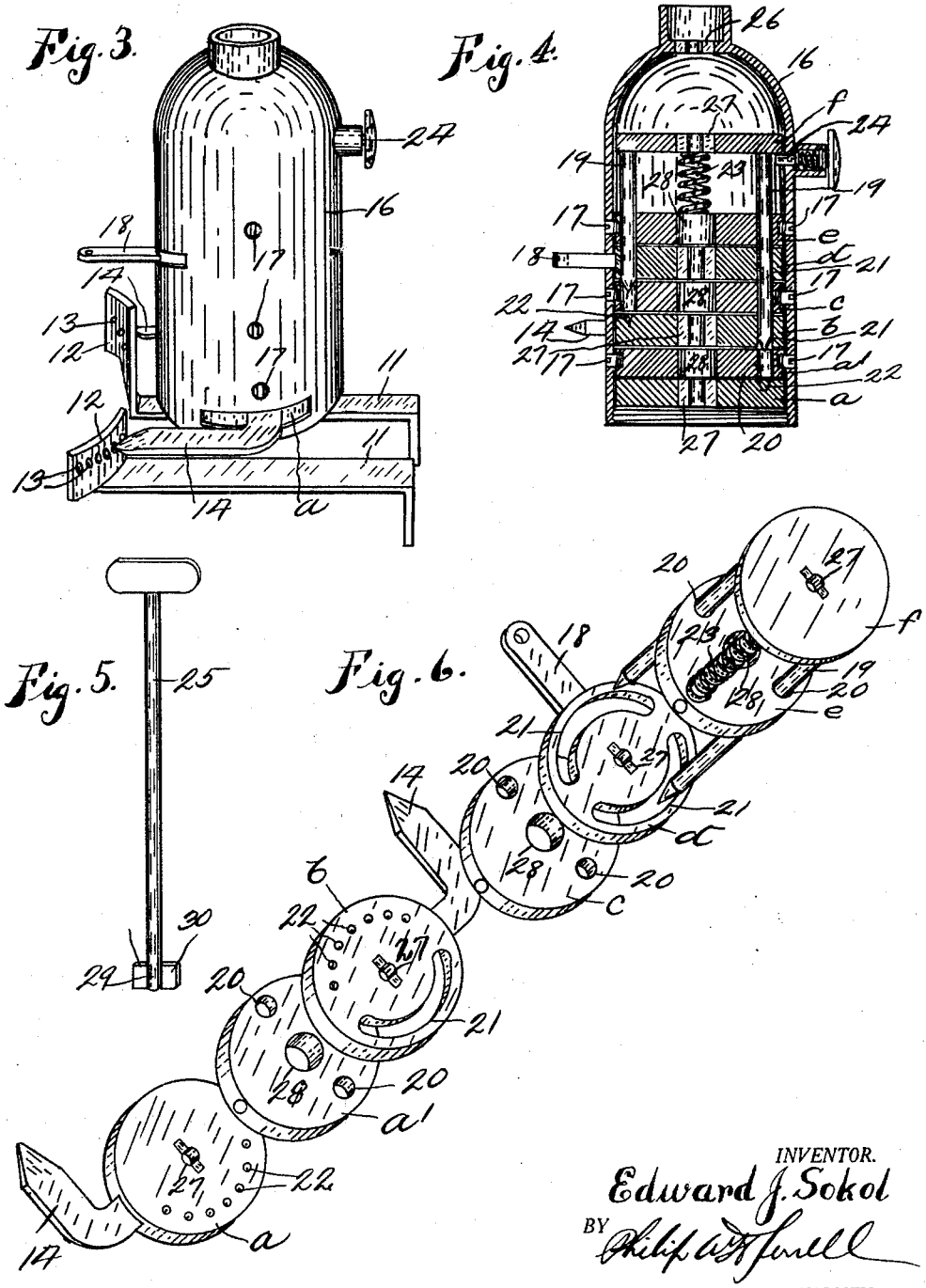

Patented July 21, 1925.

1,546,683

UNITED STATES PATENT OFFICE.

EDWARD J. SOKOL, OF ST. EDWARD, NEBRASKA.

AUTOMOBILE TRANSMISSION LOCK.

Application filed March 15, 1924. Serial No. 699,497.

*To all whom it may concern:*

Be it known that EDWARD J. SOKOL, a citizen of the United States, residing at St. Edward, in the county of Boone and State of Nebraska, has invented certain new and useful Improvements in Automobile Transmission Locks, of which the following is a specification, reference being had therein to the accompanying drawings.

The invention relates to automobile transmission locks, and has for its object to provide a device of this character carried by the transmission casing cover, and provided with arms cooperating with apertured plates mounted on arms carried by the contracting bolts of a low speed pedal shaft, and the brake pedal shaft for preventing expansion of the bands after they have been contracted thereby locking said brake and low speed pedal in operative position and consequently preventing operation of the automobile and theft thereof.

A further object is to provide in combination with the lock means for locking the cover plate of the transmission casing to the transmission casing, thereby preventing the cover plate from being removed, and the locked parts released.

A further object is to form the lock from a plurality of discs having registering apertures and disposed in a casing and key means for rotating said disc to locked or unlocked positions for locking the brake bands in contracted position, or releasing said brake bands, one of said discs controlling the cover locking mechanism, and which disc is controlled by the key.

A further object is to provide a disc having downwardly extending arms extending through apertures in arcuate slots in the discs and cooperating with spaced recesses in the band locking disc for holding said last named disc in open position after an unlocking operation, thereby preventing the disc from rotating to opposite position incident to vibration and the like.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 3 is an enlarged perspective view of the lock, showing the same in locking position.

Figure 4 is a vertical sectional view through the lock, showing the same in unlocked position.

Figure 5 is a perspective view of the key.

Figure 6 is a collective view of the lock disc, showing the same in position to be assembled.

Figure 1:
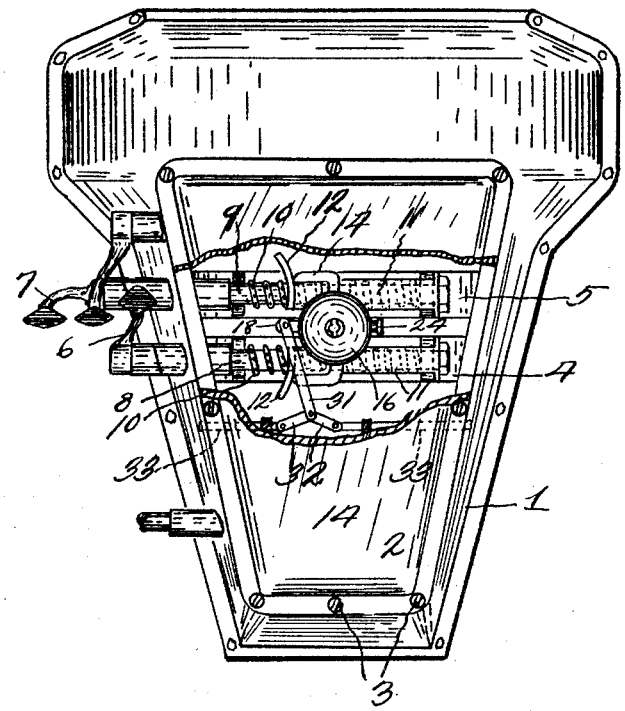
Figure 1 is a top plan view of a conventional form of transmission casing, showing a portion of the cover broken away and the locking mechanism disposed therein.
Figure 2:
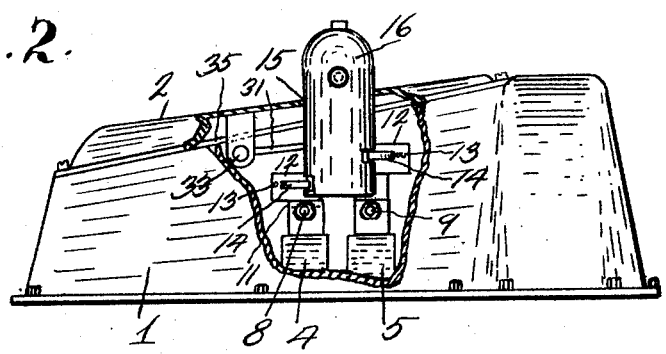
Figure 2 is a side elevation of a portion of the transmission casing showing part broken away, and the locking mechanism disposed therein.

Referring to the drawing, the numeral 1 designates the transmission casing and 2 the cover thereof, which is secured thereto by means of screws 3. Disposed within the casing 1 is a brake band 4, which when contracted in the usual manner sets the brake of the automobile and prevents operation thereof. Also disposed within the casing 1 is a low speed band 5, which operates in the usual manner. The bands 4 and 5 are contracted upon the operation of the pedals 6 and 7 by means of the bolts 8 and 9, which bolts are moved longitudinally against the action of the springs 10. Secured to the inner ends of the bolts 8 and 9 are horizontally disposed bars 11, which bars overlie the bolts 8 and 9 and the springs 10 carried thereby. Bars 11 terminate in arcuately shaped plates 12 having a plurality of apertures 13 therein, and which plates are in the path of the lock arms 14 carried by the discs $a$ and $b$. therefore it will be seen that when the pedals 6 and 7 are in operative position as shown in Figure 1 for contracting the bands 4 and 5, the angularly shaped arms 14, when in engagement with the arcuately plates 12 will hold the bands 4 and 5 against expanding under the force of the coiled springs 10, and consequently the brake pedal 6 and the low speed pedal 7 will be locked in operative position, thereby preventing operation of the automobile.

The transmission casing cover 2 has secured thereto, by welding, at 15 a cylindrical lock casing 16, and disposed in said lock casing are the discs $a$, $a'$, $b$, $c$, $d$, $e$, and $f$, which discs are superimposed, however it will be seen that the discs $a'$, $c$ and $e$ are held fixed in the casing 16 by means of the screws 17, therefore it will be seen that the discs $a$, $b$ and $d$ may be freely rotated during the locking or unlocking operation and which discs are provided with the arms 14 above referred to and the arm 18 which controls the cover locking mechanism hereinafter set forth. Disc $f$ is provided with diametrically disposed arms 19, which arms extend downwardly through apertures 20 in the fixed disc $a'$, $c$ and $e$ and through arcuate slots 21 in the movable discs $b$ and $d$, therefore it will be seen that the arms 19 will not interfere with the rotation of said disc, however when their lower ends are in engagement with any of the spaced arcuately disposed recesses 22 in the discs $a$ and $b$, it will be seen that said discs will be held against easy rotation incident to vibration and the like, especially when the discs are in unlocked positions with their arms 14 out of engagement with the arcuate plates 12. The upper disc $f$ is normally pulled downwardly by means of coiled springs 23, which are secured to said disc and to the disc $e$ by means of welding and the like, however it is shown in raised position in Figure 4 and held in said position by means of the spring actuated pin 24.

Assuming the lock is in locked position as shown in Figures 1 and 3, and it is desired to unlock the device and allow the bands 4 and 5 to expand, the key 25 is placed through the key opening 26 in the upper end of the lock casing 16, and through the key apertures 27 in the discs $f$, $d$, $b$ and $a$, and also through the enlarged apertures 28 in the stationary disc. After the end 29 of the key is in the aperture 27 of the disc $a$, said key is turned to the left, which operation will move the locking arm 14 out of cooperative engagement with one of the arcuate plates 12, and consequently allowing the band 4 to expand, the device having been previously locked by a depression of the brake pedal 6. After the disc $a$ has been moved to unlocked position, the key is slightly raised until its flanges 30 engage the under side of the disc $b$, at which time the key is turned slightly to the right until its flanges are received in the key aperture 27 thereof, and then the key is further turned to the right thereby moving the arms 14 of the disc $b$ out of cooperative engagement with the other arcuate plate 12, consequently releasing the band 5, thereby unlocking the machine. After the operation of the disc $b$ as above set forth, the key 5 is further withdrawn from the lock until it engages the under side of the disc $d$, then it is turned slightly to the right until the flanges 30 thereof are received in the key aperture 27 of the disc $d$ and the continued rotation of said disc will through the medium of the arm carried thereby, impart a pull on the bar 31, links 32 and slidable bolts 33, which slidable bolts engage under the flanges 35 of the transmission casing 1, consequently the transmission cover 2 is released, thereby allowing the same to be easily removed if desired.

After the operation of the disc $d$ the key is further removed, and the disc $f$ may be raised to the position shown in Figure 4 and held in raised position by means of the spring actuated pin 24, or left in lowered position, acting as a detent on discs $a$ and $b$ for preventing easy rotation thereof.

From the above it will be seen that a transmission lock is provided, which lock is simple in construction, will positively lock the transmission band in contracted position, and one wherein the transmission cover plate is locked in a manner whereby it cannot be removed, thereby obviating access to the interior of said transmission casing by an unauthorized person for unlocking the device.

The invention having been set forth what is claimed as new and useful is:—

1. The combination with an automobile transmission, said transmission comprising contractable transmission bands, a casing, a cover carried by said casing, pedal actuated bolts for contracting said bands, of means for locking said bands in contracted positions, said means comprising bars carried by the inner ends of the bolts and overlying the bolts, plates carried by the bars, a lock carried by the cover, angularly shaped arms carried by the lock and controllable thereby and movable into cooperative position in relation to apertures in the plates and preventing axial movement of the bolts after a contraction of the bands, and slidable bolts controlled by said lock and forming means for locking the transmission cover on the transmission casing.

2. The combination with contractable transmission bands, transmission bolts cooperating with said bands for contracting the same, spring means for expanding the bands, of locking means for locking said bands in contracted position, said means comprising a lock comprising a plurality of superimposed discs, angularly shaped arms carried by discs of said lock, bars carried by the inner ends of the bolts and overlying the bolts beneath the angularly shaped arms and apertured plates carried by the bars in the path of the angularly shaped arms.

3. A transmission lock comprising a casing, a plurality of superimposed discs disposed in said casing, alternate discs being rotatable and provided with lock controlling arms, all of said discs having key passages therethrough, the discs having lock controlling arms being provided with key head receiving apertures whereby said discs may be rotated, a vertically movable disc above the plurality of superimposed discs, spring means normally forcing the vertically movable disc downwardly, detent means for holding the vertically movable disc in raised position and downwardly extending detent arms carried by the vertically disposed and movable disc and extending downwardly through apertures in the fixed discs and arcuate slots in the rotatable discs and cooperating with arcuately disposed recesses in the rotatable discs for preventing rotation thereof.

In testimony whereof I hereunto affix my signature.

EDWARD J. SOKOL.